UNITED STATES PATENT OFFICE.

CHARLES L. ALEXANDER, OF CHARLOTTE, NORTH CAROLINA.

PLASTIC-METAL COMPOUND.

1,040,838.  Specification of Letters Patent.  Patented Oct. 8, 1912.

No Drawing.  Application filed April 26, 1910. Serial No. 557,749.

*To all whom it may concern:*

Be it known that I, CHARLES L. ALEXANDER, a citizen of the United States, residing at Charlotte, in the county of Mecklenburg and State of North Carolina, have invented certain new and useful Improvements in Plastic-Metal Compounds; and I do hereby declare the following to be a full, clear, and exact description of the invention, such as will enable others skilled in the art to which it appertains to make and use the same.

This invention relates to the production of plastic gold and other metals for the purpose of making dental inlays and the like, and has for an object to provide a metal reduced to finely divided state with the granules held plastically together by means of a waxy or other plastic binder.

A further object of the invention is to provide a material the greater content of which is metal but which is plastic and which may be varied as to its plasticity by heat or otherwise.

With these and other objects in view the invention consists of the various steps hereinafter described and claimed.

The process is started by taking a metal in granular form, the term "granular" being here employed to indicate metal in any finely divided form produced preferably by precipitation but also produced by shredding, grinding, crushing or any other mechanical means for reducing to finely divided or granular form the term "granular" being intended to comprehend any such finely divided states. Any desired quantity of such granular metal is then dipped into a liquid wax, the term "wax" being intended to comprehend any of the ordinary waxes, gums, fatty acids, oleaginous materials, or any material which will serve as a binder for the granular metal and to retain such granular metal in a plastic mass. When using wax as ordinarily understood such wax is reduced to liquid condition by heat and the granular metal immersed in or subjected to a bath of such wax. The method is preferably carried out by confining the granular metal in a bag of porous material which is dipped into the melted wax until the wax permeates all the interstices of the granular metal. The bag containing the waxed metal is now removed from such bath and the excess wax removed in any approved manner preferably by placing the bag containing the material between absorbent bodies as sheets of blotting paper and subjecting to pressure as in a press. The removal of the excess waxy material will leave the granules of metal coated with an infinitesimal thin layer of the wax and the minute interstices between such granules filled with such wax so that the mass consists of granules of metal in contact but bound together by waxy material filling the interstices.

Instead of employing the metal in granular form with the granules separated the same result is accomplished by employing the metal in matte or spongy form such as is produced by precipitation in some cases or otherwise and when dipped or otherwise subjected to the waxy bath the interstices of such matte or mass are filled with the wax which is expressed by compressing the matte the same as by the compression exerted upon the divided granules.

Plastic metal produced in accordance with the foregoing disclosure may be employed for a large variety of purposes but is especially intended for use in dentistry wherein the material itself is applied in a warmed state to the cavity of a tooth and after the cavity is filled the material is properly cooled, contoured and removed from the tooth for further manipulation in accordance with co-pending application Serial Number 557,804 filed on even date herewith. For use in the dental art in the manner mentioned it will of course be obvious that the temperature to which the material may be warmed to secure the necessary plasticity must be below the temperature at which pain will be excessive when the material is applied to the tooth and also be chilled or solidfied at a temperature which is above the temperature at which pain is also caused. In other words, the range of temperature between plasticity and solidarity must be within the range of temperature which can be borne without excessive pain when applied to a sensitive tooth excavation.

What I claim is:—

1. A mass composed of metal in a finely divided state presenting interstices filled with a waxy binder capable of plasticity at a temperature which will not cause discomfort when applied to a part of the human anatomy and of being solidified when cold.

2. A mass composed of metal in a finely divided state presenting interlying interstices filled with a waxy binder capable of being manipulated to move the metal parts one upon the other without separation or adhesion when warmed to a temperature which will not cause discomfort when applied to a part of the human anatomy and of becoming less plastic as it is cooled.

3. A mass composed of metallic particles having its interstices filled by a waxy binder capable of plasticity at a temperature which will not cause discomfort when applied to a part of the human anatomy and of being solidified when cold.

4. A mass composed of metallic particles and a plastic binder adapted to be entirely dissipated by heat of such consistency as to permit the mass to be manipulated to move the particles one upon the other without separation or adhesion when warmed to a temperature which will not cause discomfort when applied to a part of the human anatomy and of becoming less plastic as it is cooled.

In testimony whereof I affix my signature in presence of two witnesses.

CHARLES L. ALEXANDER.

Witnesses:
 JOHN L. FLETCHER,
 L. L. MORRILL.